United States Patent

Hummel

[11] 4,270,359
[45] Jun. 2, 1981

[54] SOLAR HEATING SYSTEM

[76] Inventor: Steven L. Hummel, 2403 N. Corona, Colorado Springs, Colo. 80907

[21] Appl. No.: 967,417

[22] Filed: Dec. 7, 1978

[51] Int. Cl.³ .................... F25B 27/00; F25B 27/02; F25B 13/00
[52] U.S. Cl. ........................................ 62/2; 62/513; 165/18; 62/238.6; 62/238.7
[58] Field of Search ................ 62/2, 324 D, 238 E, 62/513; 165/18; 237/1 A, 1 R; 126/427, 433

[56] References Cited

U.S. PATENT DOCUMENTS

| | | | |
|---|---|---|---|
| 2,689,090 | 9/1954 | Wetherbee et al. | 62/2 |
| 2,693,939 | 11/1954 | Marchant et al. | 62/2 |
| 2,713,252 | 7/1955 | Jackson et al. | 165/18 |
| 2,860,493 | 11/1958 | Capps et al. | 62/2 |
| 3,851,494 | 12/1974 | Hess | 62/513 X |
| 3,952,533 | 4/1976 | Johnston et al. | 62/513 X |
| 3,991,938 | 11/1976 | Ramey | 62/2 |
| 4,030,312 | 6/1977 | Wallin et al. | 62/324 D |
| 4,064,705 | 12/1977 | Edwards et al. | 62/2 |
| 4,123,003 | 10/1978 | Winston | 237/1 A |

Primary Examiner—Lloyd L. King

[57] ABSTRACT

A closed circuit heating system which is capable of extracting either "high" grade (solar) heat or "low" grade (non-solar) heat from the surrounding atmosphere and then using it to heat air, water, etc., includes a first (external) heat exchanger in the form of a solar panel for heating a volatile fluid passing therethrough which is located outdoors so as to absorb both direct solar energy (when the sun is shining) and non-solar energy, a compressor, a second (internal) heat exchanger which is connected to heat air, water or some other fluid, and an expansion valve. A volatile fluid medium is circulated through the fluid flow conduits connecting the various elements. In order to operate efficiently, the expansion valve is functionally located in the system closer to the compressor than to the first (external) heat exchanger, and the fluid flow conduits which deliver volatile fluid to and from the first (external) heat exchanger are positioned in proximity to each other to provide for heat transfer therebetween.

10 Claims, 3 Drawing Figures

SOLAR HEATING SYSTEM

BACKGROUND OF INVENTION

1. Field of the Invention

This invention relates to the utilization of "high" grade heat, such as heat produced by solar radiation, as well as all forms of "low" grade heat such as heat generated by the movement of air, heat radiated from the ground, plant and animal life, etc.

2. The Prior Art

*HAMMOND et al.*, U.S. Pat. No. 2,529,154, and *WETHERBEE et al.*, U.S. Pat. No. 2,689,090, show in general the heretofore known use of a closed circulation circuit containing a volatile fluid which is passed through an expansion valve to a heat exchanger external to the environment which is to be heated. The liquid is allowed to undergo a phase change from liquid to gaseous form in a heat exchanger whereby heat energy is extracted and drawn to the volatile fluid. The then gaseous fluid is cycled to a compressor where it is compressed and thereby heated. The volatile fluid is then cycled to a heat exchanger internal to the environment to be heated and allowed to pass in close relationship to air or water whereupon the heat in the volatile fluid which was extracted at the external heat exchanger and the heat of compression are transferred to the air or water in the environment which is to be heated. The ground is the primary source of heat in these systems.

Significantly present in these prior systems, are additional systems to circulate heat from additional and secondary sources including "atmospheric" heat. These secondary systems make the prior systems extremely complicated and cumbersome.

The object of the present invention is to utilize heat from a broad range of sources including heat derived directly from solar radiation and heat from less significant sources such as that which radiates from the earth, plants and animals, etc. A further object is to utilize a system for heat extraction which is simple in design and operation.

SUMMARY OF THE INVENTION

The present invention makes it possible to utilize the basic reversed-cycle refrigeration technique of heat extraction without the elaborate and complicated systems heretofore thought necessary. This is accomplished by positioning the external heat exchanger where solar radiation will fall directly into the exchanger when the sun shines and such radiation is present in the external environment. This positioning will, of course, allow for the extraction of heat energy from any other source when cloud cover and weather conditions block-out the direct radiation from the sun.

This placement of the external heat exchanger would be expected to subject the volatile fluid and entire system to heat input and temperature extremes heretofore thought intolerable. This stress is particularly enhanced in those regions where the temperature range from summer to winter is particularly extreme. However, two significant improvements in the prior system reduce the stress on the heating system and permit the above-described placement of the external heat exchanger and thereby make possible the operation of the system under these conditions.

First, the expansion valve is positioned in near proximity to the compressor and far proximity from the external heat exchanger. Second, there are two pipes or conduits through which the volatile fluid passes in its cycle through the external heat exchanger. A means for the exchange of heat between these conduits is provided. Preferably these conduits are constructed of a metal such as copper which is highly heat conductive and the conduits are arranged so that they touch in a lengthwise manner from the expansion valve to the external heat exchanger. As an alternative, these two conduits may be enclosed in some common and larger conduit and touching or in mere close proximity to each other. They may be buried together in the ground or enclosed in the interior of a wall of a house so long as they are in close proximity to each other. The precise manner in which heat is permitted to pass from one conduit to the other is not significant so long as a means for such a transfer is provided.

The external heat exchanger or solar panel may be constructed of tubes organized in any manner, preferably traversing the face of the external heat exchanger or solar panel in a circuitous or serpentine fashion to maximize the exposure of the volatile fluid to the heat source. Heat exchange occurs by the conduction of heat through the material making up the tubes themselves. Heat conductive metals such as copper or aluminum are particularly suited as construction materials because of their conductivity and structural strength. A dark coloring of the exterior of the tubes will, of course, enhance the heat absorption qualities of the tubes. The tubes may be attached to the surface of a darkened panel to enhance heat absorption or the panel may be constructed of two bonded metal sheets with channels which meander throughout the interface between the sheets. Other suitable arrangements of tubes or coils will obviously accomplish the desired result of a large surface area in contact with the volatile fluid and environment from which heat is to be extracted.

Any volatile fluid with a suitable vapor pressure, latent heat of evaporation and specific heat over the operable temperature range of the system will suffice, but will operate with varying degrees of acceptability. The properties of Freon-12 are most suited to the preferred embodiment of this invention.

The principles applied in the design of the present invention are quite similar to the principles of a refrigeration system. Although the processes are the same, the engineering design is specifically oriented toward collecting and utilizing solar energy to produce heat as efficiently as possible and yet make it possible to utilize heat energy from other sources, with the same system.

The purpose of the external heat exchanger or solar panel is to transfer as much heat as possible into the system. The external heat exchanger or solar panel is designed to operate at a temperature below that of the ambient air. This feature improves the daily operation of the inventive heating system in two ways. First, there is no heat loss, and all except 2% to 5% of the incident solar energy from the sun's rays is collected and utilized. Second, any air moving across the surface of the external heat exchanger will warm the surface of the external heat exchanger or solar panel, thereby increasing the heat intake of the system.

The greater the temperature difference between the external heat exchanger or solar panel and the surrounding air, the more heat is transferred into the system.

Additional heat is transferred into the system by removing heat from the moisture in the air. This is accomplished by condensing the moisture on the surface of the external heat exchanger or solar panel. Usually, this can be seen in the form of a frost layer covering the entire metal surface of the external heat exchanger or solar panel. The energy obtained by the movement of air, condensing moisture and the energy from the sun's rays combine to provide energy far in excess of that obtained from conventional solar units.

The energy transferred from the external environment by the external heat exchanger or solar panel causes the volatile fluid to change states. The word "state" as it is used herein, means either a liquid or a vapor. The volatile fluid which is being pumped through the system enters the collector as a liquid-vapor mixture. The energy collected is transferred to the volatile fluid by changing it from the liquid state to a vapor state. This absorbtion of energy is due to the change of state and not to any significant rise in temperature.

The volatile fluid, in the vapor state, is then piped to the compressor which increases the pressure resulting in a corresponding temperature rise. The electrical energy required to compress the vapor is typically 30% to 50% of the total energy output from the system.

The high pressure, high temperature vapor is then cooled in the internal heat exchanger where the volatile fluid undergoes a change of state from a vapor to a liquid. This change of state releases the energy absorbed by the volatile fluid in the external heat exchanger or solar panel.

The energy is released in the form of heat. Air or water is pumped through the internal heat exchanger to absorb the heat released, making it available for heating.

The volatile fluid leaves the condenser as a liquid when all the useful energy is removed and it passes through a valve, which expands the liquid into the liquid-vapor mixture. This mixture then enters the external heat exchanger or solar panel; thus a full cycle of the transfer of energy into and out of the system has been discussed.

The water which is heated in the condenser is then routed to a hot water tank to supply domestic hot water or to a space heating unit such as a forced air heating unit modified to include finned coils, which will transfer the heat from the water to the air passing through the cold air return.

The major advantages of the present invention over other solar heating systems are as follows:

(1) Energy is collected from the outside air; day or night, sunny or cloudy.

(2) The system will operate efficiently in cold or warm weather.

(3) The external heat exchangers usually operate at temperatures less than the air temperature.

(4) The external heat exchangers are metal; they do not have glass or plastic panels.

(5) Freezing or the requirement for draining the external heat exchangers or solar panels is eliminated.

(6) Virtually it is a maintenance free unit.

(7) It is easily installed in any home or building style.

(8) The shape and location of the external heat exchanger is not so central as in other solar heating systems and a choice of decorative facings and picturesque or business decals may be made available to blend into the homeowner's present decor.

DETAILED DESCRIPTION OF THE PREFERRED EMBODIMENTS

Figure 1:
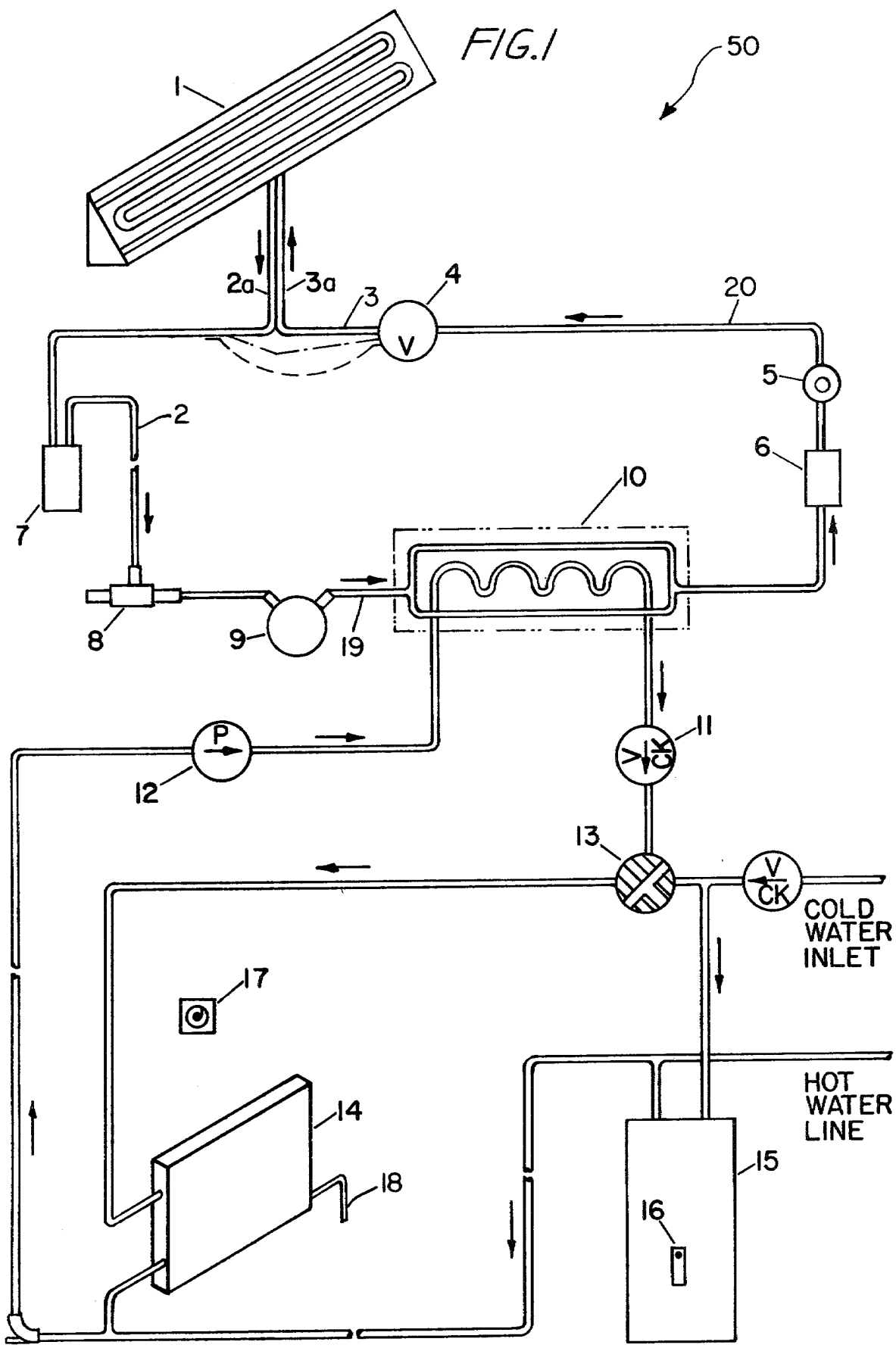
FIG. 1 schematically shows the basic heating system of the present invention as it would apply in its preferred employment in heating a building or a residential dwelling, as well as heating water for domestic use.

In FIG. 1 the basic components of the inventive heating system, generally labeled 50, are shown to be a first (external) heat exchanger or solar panel collector plate 1, a first fluid flow conduit means 2, a compressor 9, a second fluid flow conduit means 19, a second (internal) heat exchanger 10, a third fluid flow conduit means 20, and expansion valve 4, and a fourth fluid flow conduit means 3. A volatile fluid medium (refrigerant) flows through the system 50 to make it functional.

The volatile fluid medium passes through the external heat exchanger or solar panel 1 wherein it undergoes a phase change from a liquid-vapor mixture to a vapor. When this occurs, energy is extracted from the environment surrounding the external heat exchanger or solar panel 1. The volatile fluid medium passes away from heat exchanger 1 and through the conduit means 2 as a vapor. Conduit means 2 includes a portion 2a located nearest heat exchanger 1 which is in contact, or other heat exchange configuration, with a portion 3a located nearest heat exchanger 1 of conduit means 3. Heat exchange occurs between portion 2a and portion 3a and therefore between the flowing volatile fluid medium passing therethrough. As this occurs, the volatile fluid medium in portion 3a will undergo varying degrees of phase change prior to reaching the external heat exchanger 1. At the same time, the volatile fluid medium passing through portion 2a will be cooled by the heat loss to portion 3a. The effect of this heat exchange between portions 2a and 3a is greatest when large amounts of energy are available in the external heat exchanger or solar panel 1. This effect is most prevalent when the external heat exchanger or solar panel 1 is being directly heated by solar radiation striking its surface and the surrounding air is particularly warm. Under relatively mild conditions, such as occur on a cool and cloudy day, the temperature difference between the portions 2a and 3a is lower and less heat transfer occurs. However, under these circumstances, less cooling of the volatile fluid medium returning to the system is required to maintain a pressure differential which is compatable with the operation of the entire system.

The volatile fluid medium, still in a gaseous state, passes to an accumulation chamber 7 located in conduit means 2, and from there on to a pressure regulator 8 located in conduit means 2 ahead of compressor 9. This regulator acts to prevent damage to the compressor 9 should the pressure of the returning volatile fluid medium be too high. The regulated volatile fluid medium is then compressed to a high pressure in compressor 9. This compression adds additional heat to the volatile fluid medium.

The volatile fluid medium leaves the compressor 9 in a vapor state and passes via conduit means 19 to and through heat exchanger 10 where it gives up heat energy. From this point it completes its path through conduit means 20 which includes a circuit by passing through dryer 6 and sight glass 5, and enters the thermal expansion valve 4. The dryer 6 serves the dual function of removing any foreign materials from the system and any moisture. The sight glass 5 makes it possible to check the charge of the system for the presence of any air bubbles.

In order that the expansion valve 4 be located at a point neat compressor 9 and remote from the external heat exchanger 1, the second and third conduit means 19 and 20 must be shorter in combined length than the fourth conduit means 3.

The heat from the internal heat exchanger 10 is picked up by a suitable medium such as water circulating through exchanger 10. In a separate flow circuit the water will pass through check valve 11 and then valve 13 to either hot water tank 15 where it is stored until needed for household use, or in the alternative through heat coil 14 where it is employed to heat any desired enclosure. A drain elbow 18 is provided. The water is circulated by means of a pump 12.

An aquastat 16 and thermostat 17 may be used in conjunction with the water circulation circuit to coordinate the water circulation system with the heating requirements of the hot water tank and enclosure.

Figure 2:
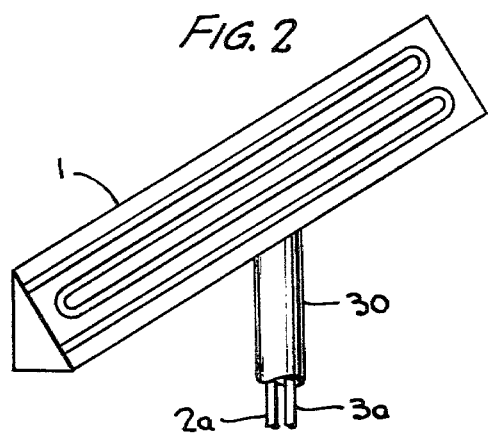
FIG. 2 shows a portion of the heating system shown in FIG. 1 which is constructed according to an alternative embodiment of the present invention.
Figure 3:
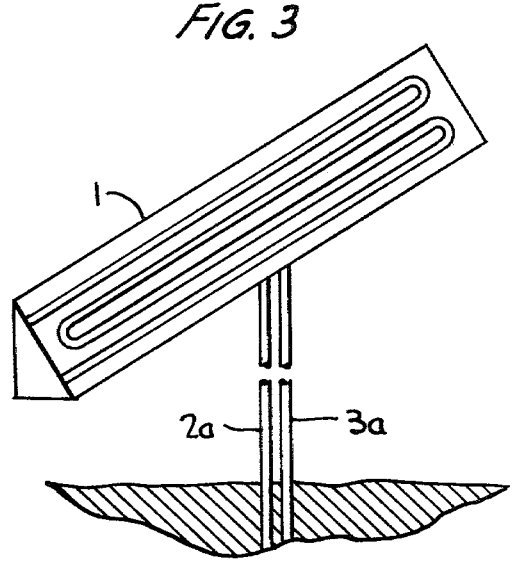
FIG. 3 shows a portion of the heating system shown in FIG. 1 which is constructed according to another embodiment of the present invention.

Turning now to FIG. 2, which shows an alternative embodiment of heating system according to the present invention, it can be seen that the portions 2a and 3a of the conduit means 2 and 3a can be enclosed in a common, larger conduit 30 to enhance the heat exchange between the portions 2a and 3a, whereas according to FIG. 3 another invention embodiment provides for the portions 2a and 3a to be buried together in the ground.

Although various embodiments of the invention have been described above, it should be appreciated that various modifications can be made therein and still fall within the scope of the invention as defined in the appended claims.

I claim:

1. A closed circuit heating apparatus which is capable of extracting both solar and non-solar heat energy from the surrounding atmosphere and using such energy to heat air, water or other fluids, the apparatus comprising
   a first heat exchanger means positioned outdoors so as to be capable of absorbing both non-solar heat from the surrounding atmosphere and solar heat directly from the sun's rays on a sunny day, said first heat exchanger including fluid flow channels through which a volatile fluid flows,
   a compressor,
   a first fluid flow conduit means connecting said first heat exchanger means with said compressor,
   a second heat exchanger means, said second heat exchanger being capable of heating air, water, or other fluid,
   a second fluid flow conduit means connecting said compressor with said second heat exchanger,
   an expansion valve,
   a third fluid flow conduit means connecting said second heat exchanger with said expansion valve,
   a fourth fluid flow conduit means connecting said expansion valve with said first heat exchanger, and wherein
   portions of said first fluid flow conduit means and said fourth fluid flow conduit means nearest said first heat exchanger means are positioned sufficiently proximate to one another to provide for heat transfer therebetween.

2. The apparatus of claim 1 wherein said portions of said first fluid flow conduit means and said fourth fluid flow conduit means extend parallel to one another.

3. The apparatus of claim 2 wherein said portions of said first fluid flow conduit means and said fourth fluid flow conduit means are in direct contact with one another.

4. The apparatus of claim 2 wherein said portions of said first fluid flow conduit means and said fourth fluid flow conduit means are enclosed within, enclosure means.

5. The apparatus of claim 1 wherein said portions of said first fluid flow conduit means and said fourth fluid flow conduit means are buried in the ground adjacent one another.

6. The apparatus of claim 1 wherein said second fluid flow conduit means includes therein an accumulation chamber and a pressure regulator.

7. The apparatus of claim 1 wherein said second and third fluid flow conduit means are shorter in combined length than said fourth fluid flow conduit means.

8. In a method of extracting heat energy from outdoors and using it to heat air, water or other fluid, the method including circulating a volatile fluid through a first heat exchanger located outdoors wherein said fluid is changed from a liquid-vapor mixture to a heated vapor, passing said vapor through a first fluid flow conduit means to a compressor wherein it is further heated, passing said heated vapor through a second fluid flow conduit means to a second heat exchanger wherein it is used to heat air, water or some other fluid and is concurrently changed to a liquid, passing said liquid through a third fluid flow conduct means to an expansion valve wherein it is changed to a liquid-vapor mixture, and then passing said liquid-vapor mixture through a fourth fluid flow conduit means to the first heat exchanger,
   the improvement comprising positioning said first heat exchanger so that it will be capable of being contacted by the sun's rays on a sunny day, and positioning portions of said first and fourth fluid flow conduit means near said first heat exchanger in close enough proximity that heat transfer between the fluids passing through each can occur.

9. The method of claim 8 wherein said portions of said first and fourth fluid flow conduits are positioned to extend parallel to one another.

10. The method of claim 8 wherein said portions of said first and fourth fluid flow conduit means are positioned to be in direct contact with one another.

* * * * *